Feb. 14, 1939. W. H. BOKENKROGER 2,147,517
VEHICLE
Filed May 3, 1937 2 Sheets—Sheet 1
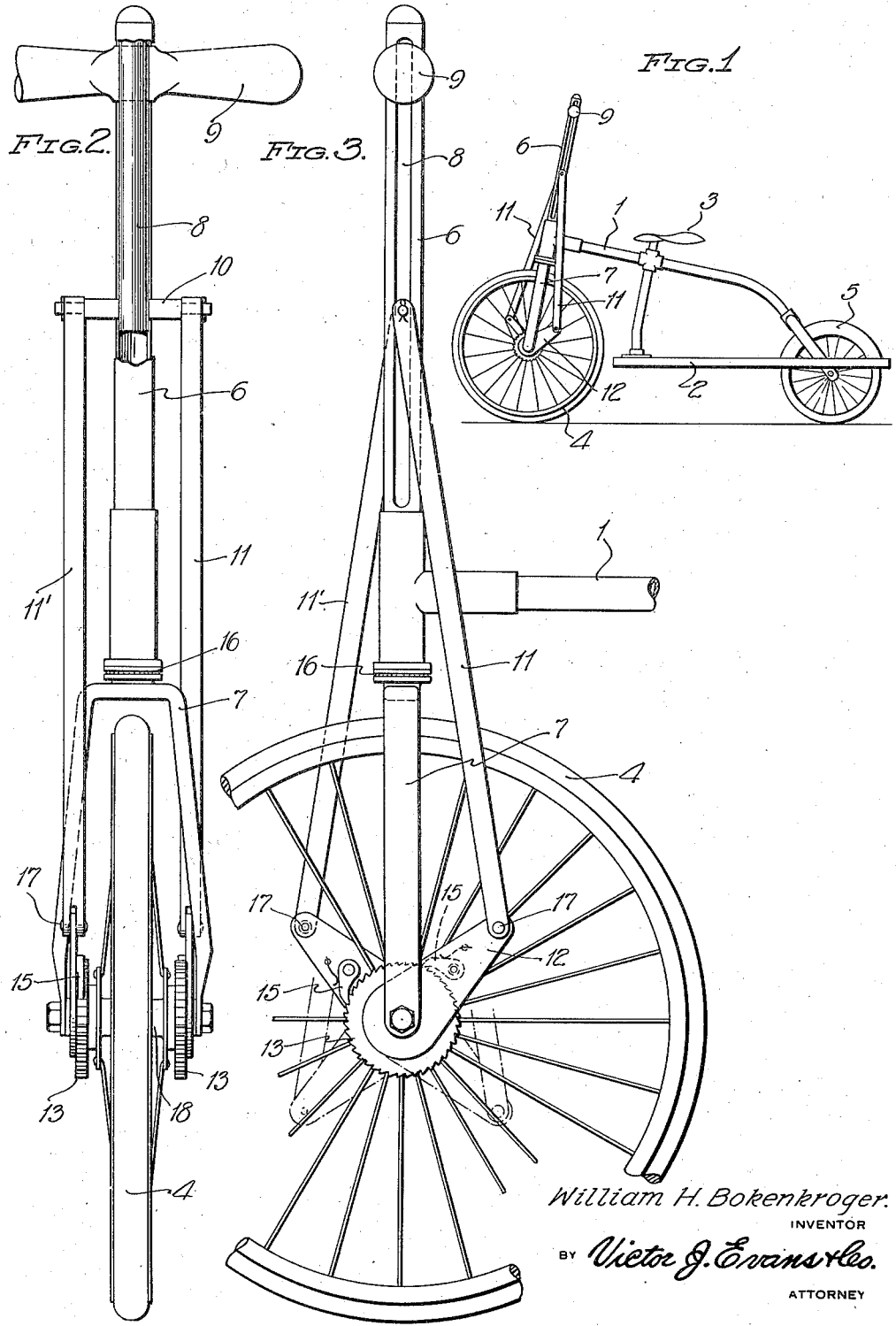
William H. Bokenkroger,
INVENTOR
BY Victor J. Evans & Co.
ATTORNEY Feb. 14, 1939.   W. H. BOKENKROGER   2,147,517
VEHICLE
Filed May 3, 1937   2 Sheets-Sheet 2
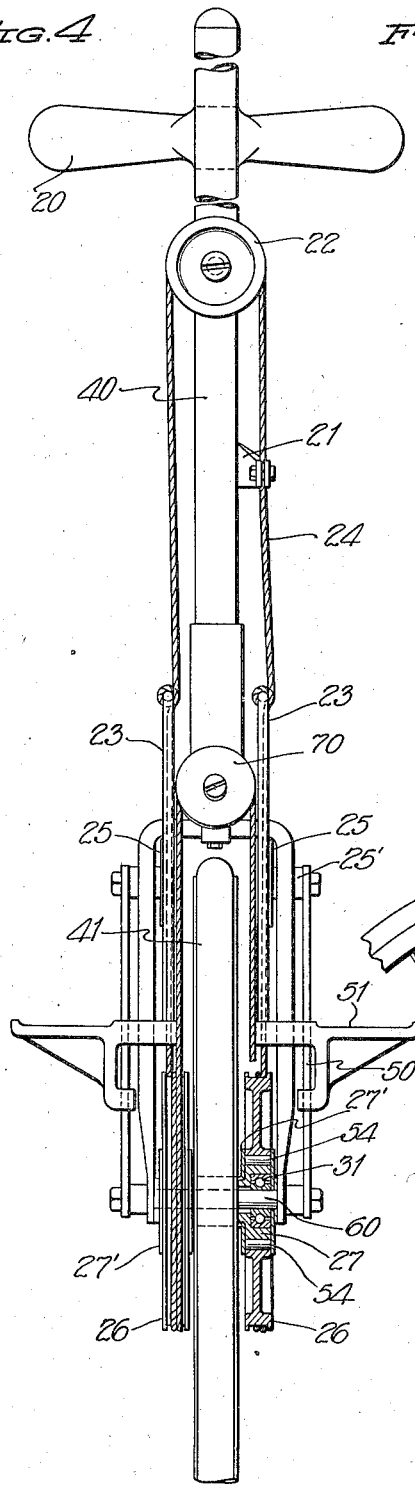
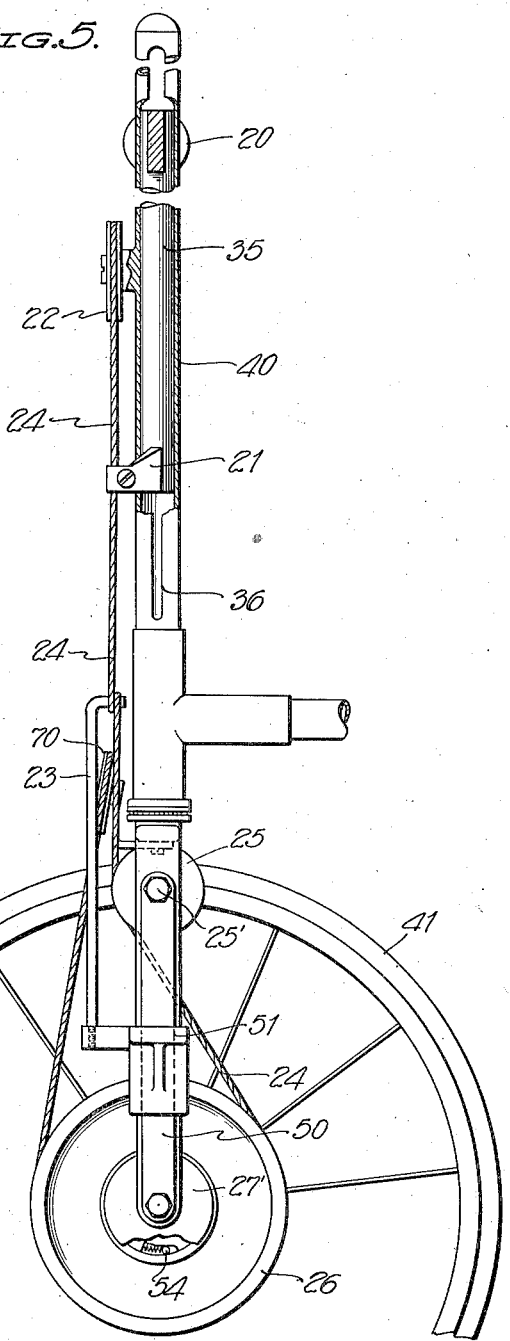
William H. Bokenkroger.
INVENTOR
BY Victor J. Evans & Co.
ATTORNEY Patented Feb. 14, 1939

2,147,517

UNITED STATES PATENT OFFICE 2,147,517

VEHICLE

William H. Bokenkroger, Hudson Falls, N. Y.

Application May 3, 1937, Serial No. 140,557

1 Claim. (Cl. 280—240)

This invention relates to road vehicles and especially to those propelled by man-power carrying the man with it.

The chief object of the invention is to provide a generally improved, and mechanically refined road-vehicle of the cycle type, incorporating various novelties to be hereinafter pointed out.

Another object of the invention is to provide a vehicle of this type which can be continuously operated by vertically reciprocating power, yet which will deliver a smooth flow of motive force to the road wheels, resulting in eliminating the jerky movement of vehicles of this type, and instead providing a forward motion of uninterrupted smoothness.

A particular object of the invention is to provide a front-wheel drive land vehicle which is adapted to receive at least three different types of front-wheel drives, and to provide said drives in particular.

The other objects, advantages, and uses, will be made more manifest as this specification proceeds.

With these concepts, objects and results in view, the invention includes the combinations, sub-combinations, mechanisms and elements shown in the accompanying drawings and set forth in detail in the following descriptive matter.

In these drawings:

Fig. 1 is a side elevation of the vehicle with one of the many forms of drives contemplated by the present invention;

Fig. 2 is a front elevation, partly broken away, of the same vehicle;

Fig. 3 is a detailed elevation of the drive portion of the same vehicle, partly broken away;

Fig. 4 is a front elevation, partly in section, and partly broken away, of a modified form of the invention, and Fig. 5 is a side elevation, partly broken away and partly in section, of the drive portion of the same modification.

In all presently contemplated forms of the invention, the vehicle is a wheeled or land vehicle comprising either two or three wheels, two of the wheels, when there are three, being located in the back as trailers, and the third and largest being located in the front and constituting the drive wheel as well as the steering wheel. In all forms, furthermore, the rider is enabled to stand on a platform and apply hand power or sit down on a seat and free wheel. Moreover, all forms are contemplated as being made essentially of steel stampings or metal die castings, in order to adapt the article to large scale quantity production.

The form shown in Figs. 1 to 3, inclusive, comprises a frame 1, including a platform 2, a seat 3, mounted on a convenient vertical member of the frame within reach of steering means on the front road wheel or steering wheel 4, and a trailer wheel or pair of trailer wheels 5 mounted on the rear of the frame and smaller than the steering wheel, preferably.

The vehicle also includes a steering column 6 which, tho of generally upright appearance, can also be slanted somewhat backwardly for conveniently placing the steering handle within reach of the rider when he is seated on the seat 3. The steering column 6 carries a fork, 7, in the usual manner of a bicycle and the hollow steering column also carries a plunger 8 vertically reciprocable therein with suitable means for lubrication, and bearing a cross-head member or cross-bar 10, at the ends of which are connecting rods or links 11 and 11'.

A hub 18 is provided to rotate on ball bearings around the front axle, not shown, and this hub bears a ratchet wheel 13 rigidly fixed thereto. Rotatably mounted on the hub is a crank arm 12, rotatable thru an arc of substantially 90° by means of the vertical reciprocation of the handle 9. This crank 12 bears a spring-held ratchet pawl or detent 15 for engaging with the ratchet wheel 13 on the upstroke of the handle 9, thus applying rotary power to the hub to which the wheel is rigidly secured by the usual spokes or the like.

On the other side of the front wheel there is provided a similar mechanism 11' etc., constructed and operating as and for the purposes described with relation to the mechanism on the other side of the wheel.

The steering column, just above the fork, is provided with a ball-bearing 16 for providing ease in steering to the right or left even while pumping the handle 9.

It will thus be seen that in this form of the invention, the rider preferably stands upon the platform 2 where he can lean his weight upon the handle 9 in pumping it. When he desires to coast, he sits on the seat 3 and even tho the handle 9 continues to reciprocate under the road-traction applied to the front wheel, yet steering is easily accomplished nonetheless.

In Figs. 4 and 5, I have disclosed a front-wheel drive land vehicle motivated by reciprocating power, comprising a frame, not shown, and one or two rear wheels, as well as the platform and seat of the first form, and a steering column 40 for coaction with the front wheel 41 by means of mechanism to be described. A suitable steering handle and pump handle 20 is provided to work in slots in the side of the substantially vertical steering column, and the handle is attached at right angles to a plunger 35 for vertical reciprocation within the steering column with suitable lubricating means, not shown.

Projecting from the lowermost end of the plunger 35 is an angled clamp 21 also reciprocating in the slot, and adapted to clampingly engage the tensile member 24, preferably constructed as a flexible steel or wire cable. The tensile member passes over a pulley member 22 located on the steering column and serving to divert the cable into two bights, as shown.

Projecting from the axle of the front wheel is a vertically extending member 50 forming a suitable guide and support for a foot pedal structure 51 adapted to be vertically reciprocated on the guide under suitable conditions. Extending vertically from the front projection of the member 51 is a cable-engager 23, one being located on each side of the foot pedal member 51. The drive-cable 24 is passed around the hook on the member 23 with a half-hitch or other suitable engagement loop, and thence around vertically extending sheaves 25 mounted on an axle 25', as shown.

Thence the drive cable passes around a pulley 26. The pulley 26 is adapted to intermittently engage the hub 27 closed off by hub plates 27' at both ends. The hub 27 bears rollers 54 at spaced peripheral intervals, the rollers being spring-urged as shown in Fig. 5. The hub is mounted by means of ball bearings 31 on the axle 60, and it is thus obvious that the cable drives the wheel by rotating the pulley only on the down stroke by intermittent engagement by the pulley with the hub on those occasions.

Thence the drive-cable passes upwardly and around a sheave 70 and down and around another pulley arranged and functioning like the one just described. Thence the drive cable passes upwardly over another member 23 and thence back to the member 22.

It is thus obvious that whether either the drive handle 20 or the pedals 51 be employed, the pulleys 26 and 26' drive respectively only on the downward and on the upward stroke of the power-applying members 20 and 51, that is, they drive intermittently by means of an intermittent, uni-directional clutch mechanism associated with the respective pulleys for respective drive directions.

In this embodiment, as well as in the preceding, the vehicle is adapted to be driven either while standing up or seated, and it can also be allowed to free-wheel or coast down a declivity or along a level stretch if momentum has been gathered.

What is claimed as new is:

A road-vehicle, comprising a frame, road-wheels thereon, one of same constituting a steering instrumentality, a steering column mounted thereon, a member reciprocable therein, a hub on the wheel, an intermittent and uni-directional clutch on each side of said hub, a pulley attached to said clutch on each side of the road-wheel, connections between the reciprocable member and the pulleys, said connections comprising a tensile member divergently passed at its top portion over a member on the steering column, a clamp on the reciprocable member for seizing the tensile member to reciprocate same, a sheave for directing the member rearwardly and over the right hand pulley, means for directing the rest of the cable up over the steering wheel and around the left hand pulley, and means for directing the balance of the tensile member up over the divergency on the steering column.

WILLIAM H. BOKENKROGER.